No. 708,088. Patented Sept. 2, 1902.
A. SORGE, Jr.
SYSTEM OF FEED WATER PURIFICATION.
(Application filed Mar. 2, 1899. Renewed Mar. 12, 1902.)
(No Model.)
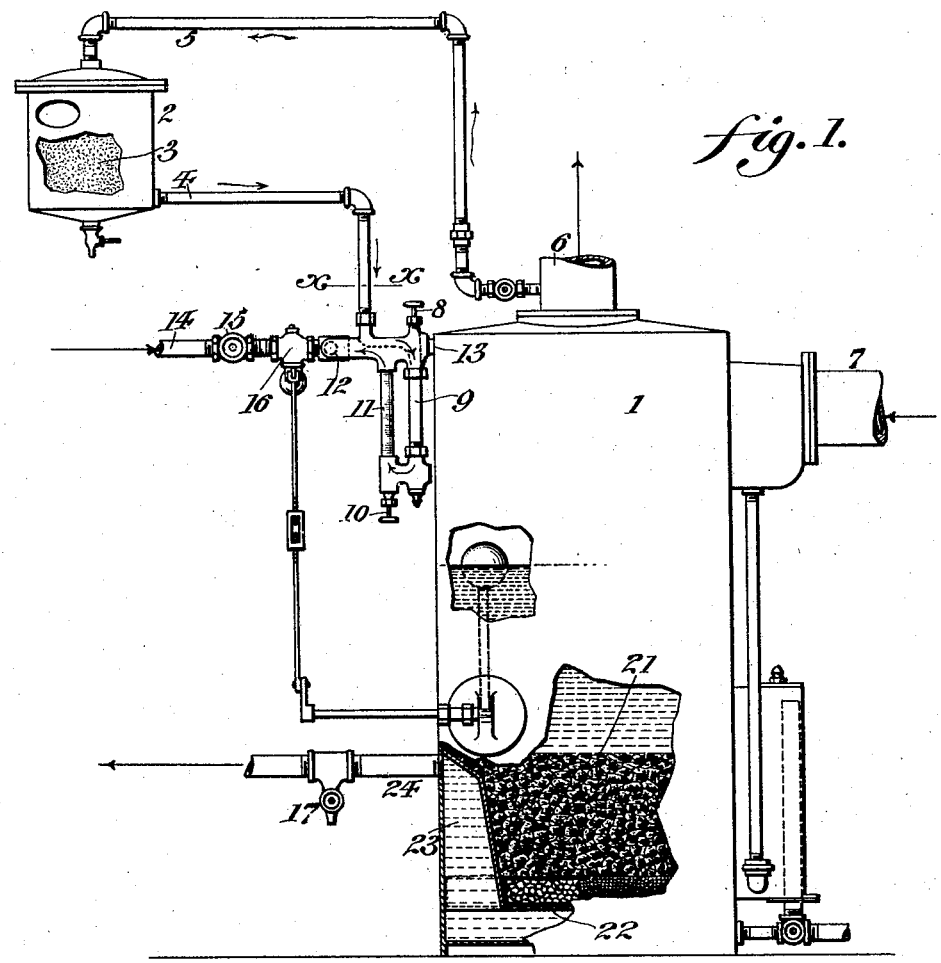
fig. 1.
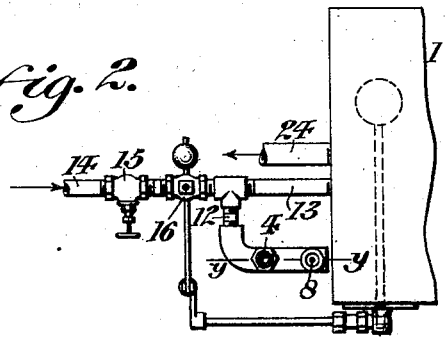
fig. 2.
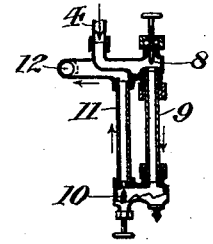
fig. 3.
Witnesses
fig. 4.
fig. 5.
Inventor
Adolph Sorge, Jr.
By Diedersheim & Fairbanks
Attorneys ly been located.

UNITED STATES PATENT OFFICE.

ADOLPH SORGE, JR., OF CHICAGO, ILLINOIS.

SYSTEM OF FEED-WATER PURIFICATION.

SPECIFICATION forming part of Letters Patent No. 708,088, dated September 2, 1902.

Application filed March 2, 1899. Renewed March 12, 1902. Serial No. 97,811. (No model.)

*To all whom it may concern:*

Be it known that I, ADOLPH SORGE, Jr., a citizen of the United States, residing in the city of Chicago, county of Cook, State of Illinois, have invented a new and useful Improvement in Systems of Feed-Water Purification, which improvement is fully set forth in the following specification and accompanying drawings.

My invention consists of an improved system of feed-water purification wherein I treat feed-water heated in a feed-water heater of suitable construction by means of chemicals, so as to precipitate the scale-forming material, which consists usually of the carbonates and sulfates of lime, magnesia, soda, and potassa. I then filter out the precipitates and pass the purified water to the pump, and thence to the boiler. To accomplish the above ends satisfactorily, it is primarily necessary to be able to regulate the supply of chemical with great exactness, to feed this chemical in the required quantities and continuously into the heater, and, further, to mix said chemical thoroughly with the water to be treated. I next provide a very large amount of depositing-surface and close filtration, and finally also furnish a simple means capable of being handled by men of very ordinary intelligence for the purpose of determining the proper amount of chemical to be fed, it being desirable that the chemical shall be in the form of a solution, and that this solution shall always be of substantially the same strength, and that the regulation of the amount of the chemical introduced shall be readily effected. It is also essential to employ positive means for determining the quantity of the chemical fed; and to the above ends my invention consists in the novel construction and assemblage of parts, all as will be hereinafter fully set forth, and particularly pointed out in the claims.

Figure 1 represents a side elevation of a system of feed-water purification embodying my invention. Fig. 2 represents a sectional plan view of a portion of Fig. 1, the section being taken on line *x x* of said figure. Fig. 3 represents a section on line *y y*, Fig. 2. Figs. 4 and 5 represent a perspective view of the testing devices employed, to be hereinafter referred to.

Similar numerals of reference indicate corresponding parts in the figures.

Referring to the drawings, 1 designates a feed-water heater of any suitable and convenient construction, at a suitable point above or near which I place a tank or vessel 2, which is filled by any convenient means with the dry chemical 3 in the form of a salt. At or near the bottom of the tank 2 I attach a pipe 4, which leads to the water-inlet pipe of the heater, or it may be independently led to a distributing trough or pan, (not shown,) if so desired. At some other convenient point I attach to the tank 2 another pipe 5, which connects with either the heater 1 or with some space or pipe connected with the heater and filled with steam of the same tension as the heater, the pipe 6 in the present instance serving as an outlet for the exhaust-steam from the heater, while said steam enters through the pipe 7, as is customary. The pipe 5 has the function of an equalizing-pipe, and its effect is (as it and the chemical-tank are located in exposed positions) to condense in this tank sufficient steam to fill all the spaces between the particles of dry chemical. In this way a concentrated solution of the chemical is produced in the tank 2, and as fast as a drop of chemical solution is withdrawn a drop of condensed steam takes its place, thus keeping constantly a saturated solution until all the chemical contained in said tank has been dissolved. The chemical passes through the pipe 4 on its way to the heater through the passage controlled by a needle-valve 8, whereby the supply is regulated, the regulating type of apparatus shown in the present instance being a sight-feeder, known as the "Ashton," which I have found to yield excellent and reliable results, particularly on account of the fact that the chemical is warmed just prior to passing through the needle-valve, thus preventing deposits and obstruction. The chemical and solution pass down the pipe 9, thence through the passage controlled by valve 10, upwardly through the pipe 11, thence through the branch 12 into the pipe 13, through which it enters the heater 1, it being seen that the pipe 13 is a continuation of the feed-water pipe 14, the latter being provided with a valve 15 and an automatically-operated regulating-valve 16, the construction of which latter apparatus forms *per se* no part of the present invention and therefore requires no detailed description.

Another arrangement is to place the tank 2 on the floor or at any convenient height. The equalizing-pipe 5 being attached to the tank in a similar manner to that described and the feed pipe 4 also being attached to the needle-valve, as already shown, the pipe 5 will gradually fill with condensed steam after the tank is full. The pipe 5 is attached and arranged in such a manner that its upper point shall be somewhat higher than the point at which the chemical enters the heater. A hydrostatic head is thus formed in pipe 5, forcing the concentrated chemical solution out of the tank through pipe 4. By this arrangement I am enabled to place the chemical-tank in any desired or convenient position.

The chemical which I prefer to employ in practice in the tank 2 is ordinary commercial soda-ash, (carbonate of soda,) although trisodium phosphate and other materials can be used. The reaction with the soda-ash is that the same acts on the carbonates, which are precipitated from the feed-water at a temperature of 180° to 200° Fahrenheit in such a manner as to make the precipitate assume a flocculent form, which will dry in the form of a powder when heated, but will not produce scale. On the sulfates the soda-ash acts by transforming them into the carbonates of lime and magnesia, which are deposited, while the soda-ash itself is transformed into the sulfate of soda, an exceedingly soluble salt, whose solubility increases with a rise in temperature and which will therefore not deposit, but remains in the water and passes on to the boiler. This sulfate of soda is acid in its reaction and will attack iron in the boiler, thus causing corrosion and pitting if the acidity is not neutralized. An intermittent injection of soda-ash will therefore be an actual detriment, although keeping the boiler free from scale. In order to overcome this acidity of the water, I inject a just sufficient excess of soda-ash solution (which is alkaline) to slightly more than neutralize the sulfate of soda. As the reaction between the soda-ash and the sulfates is a very positive and searching one, therefore we are sure that a sufficient amount has been introduced if the water is neutral or slightly alkaline in its reaction. If the water is strongly alkaline, then it will cause foaming in the boiler, and therefore this also must be avoided.

It is a well-known test for alkalies to use phenol-phthalein dissolved in alcohol. By this chemical one part of alkali in one million parts of water can be detected. I employ this reaction for determining the regulation of the chemical feed. At the pump or some other convenient point I attach a cock 17, from which I draw periodically a sample of the water delivered from the heater. Into this sample I introduce a single drop of a solution of phenol-phthalein in alcohol. If no discoloration of the water occurs, then the same is either neutral or acid and the needle-valve must be opened, so as to increase the amount of chemical fed. If the water turns distinctly red, then it is decidedly alkaline and the chemical feed must be reduced. The proper reaction is the appearance of a very faint pink discoloration, which indicates a very slight alkaline reaction. This test is delicate and still so very simple that the most ignorant can apply it. For the purposes of the test I furnish a test-tube 18, provided with a holder, a bottle 19 of solution phenol-phthalein in alcohol, and a glass rod 20 for dipping into the phenol-phthalein solution to obtain a single drop (which is all necessary) and then stirring the sample of water in said test-tube with this rod.

In all properly-constructed feed-water heaters and purifiers a depositing and filtering bed is provided, through which the water passes on its way to the pump. In order to insure thorough filtration, I place in the bottom of the heater and below the usual filter-bed 21 another bed 22, made of fine material—such as crushed quartz, hard-burned bricks, &c.—through which the water must pass before leaving the heater. I have found the most convenient form of this filtering-bed to consist of bags made of some suitable cloth (as burlap) in the form of cushions and whose surface corresponds and conforms closely to the form of the heater, as indicated at the lower portion of Fig. 1, so as to prevent the passage of water through any openings, the interior of these bags being filled with crushed quartz, having sharp edges, and the water after filtering therethrough flowing through the passage 23 to the pipe 24, having the cock 17 therein. When the heater is to be cleaned, these bags are removed after the superincumbent filtering material has been taken out. The bags are then thoroughly scrubbed and washed and are replaced in the heater, the regular filter-bed being placed upon them.

It will be evident that slight changes may be made by those skilled in the art which will come within the scope of my invention, and I do not therefore desire to be limited in every instance to the exact construction I have herein shown and described.

Having thus described my invention, what I claim as new, and desire to secure by Letters Patent, is—

1. In a feed-water purifier, the combination of a feed-water heater, a closed tank containing a purifying ingredient, a pipe leading from the steam-space of said heater into the upper portion of said tank, whereby the water of condensation passes through said tank and purifying ingredient in its path to said heater, a feeding device, a pipe leading from said tank to said feeding device and a feed-water inlet-pipe communicating with said feeding device, the latter being connected with said heater.

2. In a feed-water purifier, the combination of a feed-water heater, a tank containing a purifying ingredient, a pipe leading from the steam-space of said heater into the upper portion of said tank, a feeding device, a pipe leading from said tank to said feeding device, a feed-water inlet-pipe communicating with said feeding device, a connection from the latter to said heater, a filtering device for the water in said heater and a pipe for conducting the filtered and purified water from said heater, said last-mentioned pipe having therein means for drawing off and testing the water prior to its entrance into the boiler.

3. In a feed-water purifier, a feed-water heater having an outlet leading to a boiler, a tank containing a purifying ingredient, said tank communicating with the heater by a plurality of pipes, one of said pipes communicating with the steam-space of said heater, whereby steam passes therefrom into said tank to be condensed therein, said parts being so constructed that the water of condensation passes through the tank and purifying ingredient therein and returns to said heater, and a filter through which the water passes between said heater and said boiler.

4. In a feed-water purifier, a feed-water heater, a tank containing a purifying ingredient, a pipe communicating with the upper portion of said tank and with the steam-space of said heater, another pipe communicating with said tank and with said heater, a filtering device within said heater, consisting of a plurality of filtering-beds, a passage or chamber in which the filtered water is received, and an outlet-pipe leading therefrom.

5. The combination of a feed-water heater, a closed tank containing a purifying ingredient, a pipe leading from the steam-space of said heater into the upper portion of said tank, whereby the water of condensation passes through said tank and purifying ingredient in its path to said heater, a feeding device, a pipe leading from said tank to said feeding device, a feed-water inlet-pipe communicating with said feeding device, the latter being connected with said heater, a filtering device in the lower portion of said heater, and an outlet-pipe for the filtered water.

6. The combination of a feed-water heater, a closed tank containing a purifying ingredient, a pipe leading from the steam-space of said heater into the upper portion of said tank, whereby the water of condensation passes through said tank and purifying ingredient in its path to said heater, a feeding device, a pipe leading from said tank to said feeding device, a feed-water inlet-pipe communicating with said feeding device, the latter being connected with said heater, a filtering device in the lower portion of said heater, and an outlet-pipe for the filtered water, in combination with means for testing the purified and filtered water prior to its entrance to the boiler.

ADOLPH SORGE, JR.

Witnesses:
ANTON B. OBERMEYER,
FREDERICK H. MASON.